United States Patent
Wang et al.

(10) Patent No.: US 10,529,100 B2
(45) Date of Patent: Jan. 7, 2020

(54) INTERACTION-DRIVEN FORMAT FOR GRAPH VISUALIZATION

(71) Applicant: VMware, Inc., Palo Alto, CA (US)

(72) Inventors: Zhe Wang, Beijing (CN); Xiangjun Song, Beijing (CN)

(73) Assignee: VMWARE, INC., Palo Alto, CA (US)

(*) Notice: Subject to any disclaimer, the term of this patent is extended or adjusted under 35 U.S.C. 154(b) by 85 days.

(21) Appl. No.: 15/949,085

(22) Filed: Apr. 10, 2018

(65) Prior Publication Data

US 2019/0311508 A1    Oct. 10, 2019

(51) Int. Cl.
G06T 11/20    (2006.01)
H04L 12/24    (2006.01)

(52) U.S. Cl.
CPC ........... *G06T 11/206* (2013.01); *H04L 41/22* (2013.01)

(58) Field of Classification Search
CPC .............................. G06T 11/206; H04L 41/22
USPC ......................................................... 345/440
See application file for complete search history.

(56) References Cited

U.S. PATENT DOCUMENTS

| | | | |
|---|---|---|---|
| 7,880,749 B2* | 2/2011 | Favart | G06F 9/455 345/440 |
| 9,613,086 B1* | 4/2017 | Sherman | G06F 16/248 |
| 2005/0114383 A1* | 5/2005 | Beringer | G06F 16/9038 |
| 2013/0187941 A1* | 7/2013 | Noon | G06T 11/60 345/589 |
| 2016/0267397 A1* | 9/2016 | Carlsson | G06N 5/025 |
| 2019/0005115 A1* | 1/2019 | Warrier | G06F 17/18 |

OTHER PUBLICATIONS

Michael Bostock et al., "D3: Data-Driven Documents", Journal of IEEE Transactions on Visualization and Computer Graphics, 2011, pp. 2301-2309, vol. 17, Issue 12.
Mathieu Bastian et al., "Gephi : An Open Source Software for Exploring and Manipulating Networks", International AAAI Conference on Weblogs and Social Media, 2009.
Zhicheng Liu et al., "imMens: Real-time Visual Querying of Big Data", Eurographics Conference on Visualization, 2013, vol. 32, No. 3.

(Continued)

*Primary Examiner* — King Y Poon
*Assistant Examiner* — Vincent Peren
(74) *Attorney, Agent, or Firm* — Su IP Consulting

(57) ABSTRACT

A method for interactively visualizing a graph includes maintaining objects, operations, reactions, and interactions in volatile memory, receiving user input of interactions each specifying one or more reactions to visually transform one object when selected by one or more operations, and writing the objects, the operations, the reactions, and the interactions in a computer-readable file. The method further includes exporting a number of the objects to a render function in an application framework to render them, receiving an event from an event listener in the application framework, determining an operation selecting an object based on the event, determining an interaction corresponding to the object and the operation, determining at least one reaction corresponding to the interaction, and instructing the render function to visually transform the object with the at least one reaction.

24 Claims, 8 Drawing Sheets

(56) References Cited

OTHER PUBLICATIONS

Alper Sarikaya et al., "Using WebGL as an Interactive Visualization Medium: Our Experience Developing SplatterJs", IEEE, 2015.
Keith Andrews et al., "FluidDiagrams: Web-Based Information Visualisation using JavaScript andWebGL", Eurographics Conference on Visualization (EuroVis), 2014.
Steven M. Drucker et al., "A Unifying Framework for Animated and Interactive Unit Visualizations", 2015.
Donghao Ren et al., "Stardust: Accessible and Transparent GPU Support for Information Visualization Rendering", Journal of Computer Graphic Forum, 2017, vol. 36, No. 3.
Jungu Choi et al., VisDock: A Toolkit for Cross-Cutting Interactions in Visualization, IEEE Transactions on Visualization and Computer Graphics, Sep. 1, 2015, vol. 21, Issue 9.

\* cited by examiner

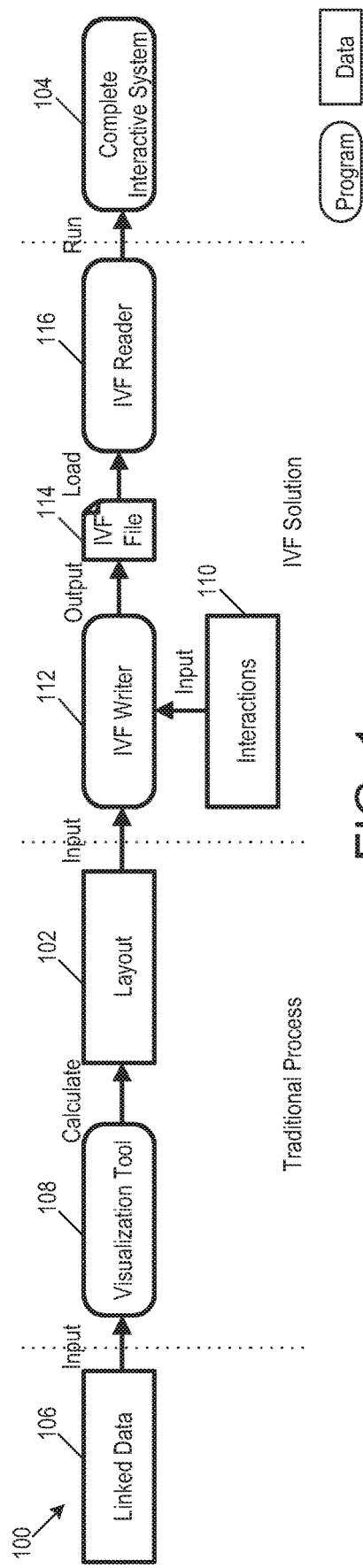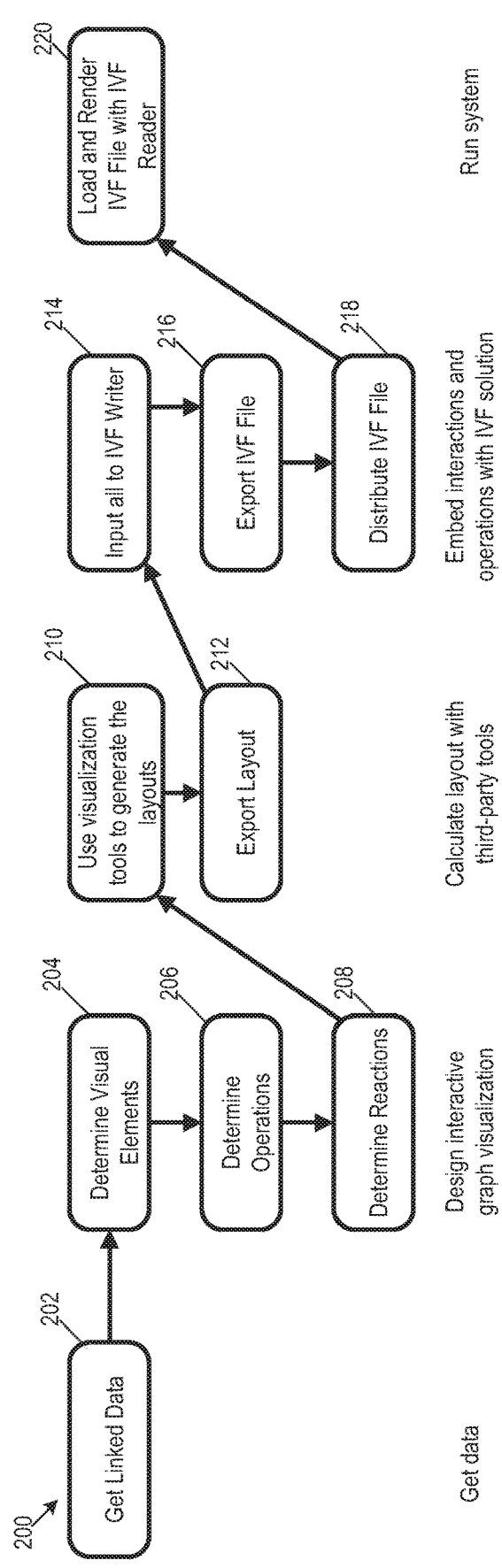

```
1   {
2     "object":[
3       [0, 1, {"id": 1, "c": 0, "w": 0.2, "x": 1.3, "y": 1.3, "z": 0}],
4       [0, 1, {"id": 2, "c": 0, "w": 0.2, "x": 2.0, "y": 2.0, "z": 0}],
5       ...
6       [-1, 0, {"id":51, "amplab/iolap\nlanguage: Scala\nforks: 5"}],
7       ...
8     ],
9     "interaction":[
10      [1, [1, 51], [2, 2], [3, 1001, 1002, 1003...1071]]],
11      ...
12    ],
13    "colorTable":{"0": "0xffffff"},
14    "reactionTable":{"1": "INFODISPLAY", "2": "ENLARGE", "3": "ADD_LINE"},
15    "operationTable":{"1": "pick"},
16  }
```

FIG. 4

INTERACTION-DRIVEN FORMAT FOR GRAPH VISUALIZATION

BACKGROUND

Interactive graph visualization is becoming increasingly important. It can be used to manage large network systems, such as an Internet of Things (IoT) system with billions of nodes. A system that provides such visualization should provide a seamless and highly interactive user experience to explore the data in a graph.

BRIEF DESCRIPTION OF THE DRAWINGS

FIG. 1 is a block diagram illustrating a process in which an "IVF" file format extends a graph layout to a complete interactive system in examples of the present disclosure.

FIG. 2 is a block diagram illustrating a workflow to build an interactive graph with the IVF solution in some examples of the present disclosure.

FIG. 4 is a block diagram illustrating a data structure of the IVF file of FIG. 3 in some examples of the present disclosure.

DETAILED DESCRIPTION

Figure 3:
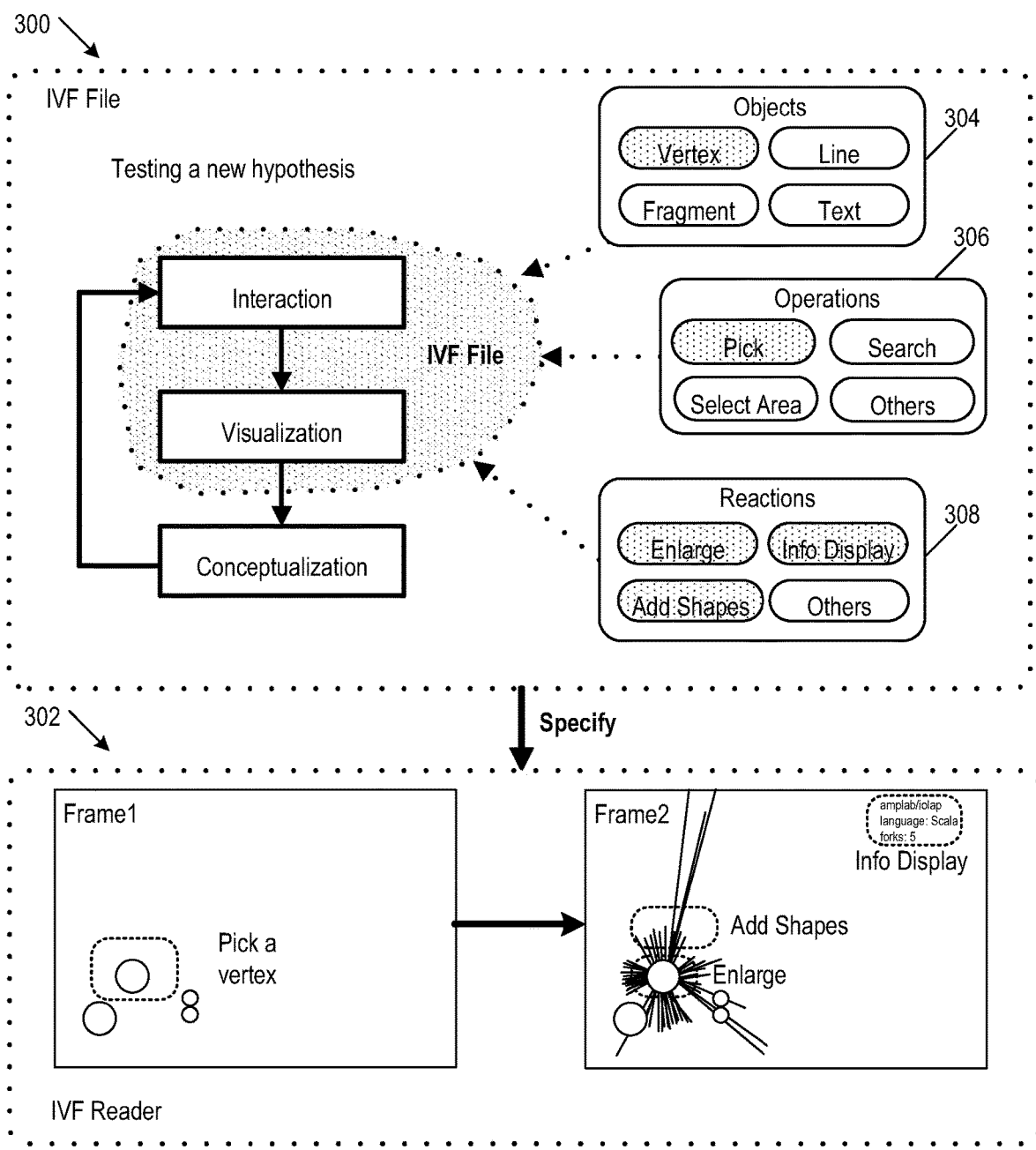
FIG. 3 is a block diagram demonstrating how an IVF file specifies an interactive process presented by an IVF reader of FIG. 1 in some examples of the disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Software tools such as Gephi can visualize graphs. However, few tools simplify the development of their output layouts to a complete interactive system. Although solutions like d3.js can reduce the effort to some extent, few of them can provide a simple interface for developers to specify large-scale interactive graph visualization with little programming.

Examples of the present disclosure provide a GPU-based runtime with a proposed file format named "IVF." FIG. 1 is a block diagram illustrating a process 100 in which an "IVF" file format extends a graph layout 102 to a complete interactive system 104 in examples of the present disclosure. First, linked data 106 are received by a visualization tool 108, which arranges the linked data into graph layout 102. Linked data 106 usually include nodes and edges connecting the nodes. Graph layout 102 may be calculated by visualization tool 108 using any layout method, such as a forced-based layout method. Graph layout 102 and interactions 110 with linked data 106 are received by an IVF writer 112, which saves them in a portable IVF file 114. An IVF reader 116 loads IVF file 114 and presents an interactive graph that a user can manipulate with interactions 110. IVF reader 116 runs on any application framework and leverages a low-level 3D graphics application programming interface (API) to render the graph. The application framework may be a browser and the low-level 3D graphics API may be WebGL, or the application framework may be Qt and the low-level 3D graphics API may be OpenGL.

As shown in FIG. 1, by specifying graph layout 102 and interactions 110 in IVF file 114, an interactive system 104 is established with reduced system implementation difficulties and increased system scalability and performance. Interactive system 104 can run everywhere with IVF reader 116, even for a large graph with billions of nodes.

FIG. 2 is a block diagram illustrating a workflow 200 to build an interactive graph with the IVF solution in some examples of the present disclosure. In block 202, linked data (e.g., linked data 106 in FIG. 1) is received. Block 202 may be followed by block 204.

In blocks 204, 206, and 208, a developer designs interactive graph visualization. In block 204, visual elements are determined from the linked data. The visual elements may be vertices, lines, or fragments. Block 204 may be followed by block 206. In block 206, operations for selecting the visual elements are determined. The operations may be picking a visual element, searching for a visual element, or selecting one or more visual elements in an area. Block 206 may be followed by block 208. In block 208, reactions to the operations are determined. The reactions may be enlarging a visual element, displaying information about a visual element, or adding shapes about a visual element. Block 208 may be followed by block 210.

In blocks 210 and 212, the developer calculates graph layout with a visualization tool (e.g., visualization tool 108 in FIG. 1). In block 210, the visualization tool generates a graph layout (e.g., graph layout 102 in FIG. 1) for the visual elements. Block 210 may be followed by block 212. In block 212, the graph layout is exported. Block 212 may be followed by block 214.

In blocks 214, 216, and 218, the developer embeds interactions (e.g., interactions 110 in FIG. 1) in an IVF file (e.g., IVF file 114 in FIG. 1). In block 214, the graph layout, the operations, and the reactions are received by an IVF writer (e.g., IV writer 112 in FIG. 1). The IVF writer also receives interactions specifying one or more reactions to visually transform a visual element when that visual element is selected by an operation. Block 214 may be followed by block 216. In block 216, the IVF writer exports the graph layout, the operations, the reactions, and the interactions to an IVF file. Block 216 may be followed by block 218. In block 218, the IVF file is distributed. Block 218 may be followed by block 220.

In block 220, a user runs an IVF reader (e.g., IVF reader 116 in FIG. 1) to load the IVF file and render a graph. The user interacts with the graph, which is visually transformed according to the interactions specified in the IVF file.

The IVF file format enumerates interactions (e.g., interactions 110 in FIG. 1) in graph visualization by generalizing use cases, like picking and displaying information. These interactions are abstracted and implemented in the IVF reader while considering platform compatibility. Performance is improved by using a low-level 3D graphics API, such as WebGL or OpenGL, to render each of the nodes with only a single calculation on vertex transformations.

FIG. 3 is a block diagram demonstrating how an IVF file 300 (e.g., IVF file 114 in FIG. 1) specifies an interactive process 302 presented by an IVF reader (e.g., IVF reader 116 in FIG. 1) in some examples of the disclosure. IVF file 300 includes three parts: (1) objects 304, (2) operations 306, and (3) reactions 308. Objects 304 include visual elements such as vertices, lines, and fragments. Objects 304 also include text elements. Operations 306 record the ways in which a visual element can be selected. Operations 306 include pick, search, and select area. Reactions 308 include enlarge, displaying information, and add shapes, which are set to respond to one or more operations specific to a visual element.

For interactive process 302 shown from frame1 to frame2, the user-specified object, operation, and reactions are illustrated with grey boxes in IVF file 300. As indicated in IVF file 300, a vertex can be picked and, when picked, it will be enlarged, lines will be added, and its text information (e.g., its domain) will be displayed. The text information may be included in objects 304 as a text element.

FIG. 3 also illustrates a typical process for a user to comprehend a graph in some examples of the present disclosure. The process includes three modes: interaction, visualization, and conceptualization. When studying a graph, the user looks at its representation and interacts with it (interaction). Visual transformation is then performed in response the interaction (visualization). Influenced by the visualization, the user's mental model of the graph is refined (conceptualization) so another interaction is conducted to test the user's hypotheses further (next loop).

The above process combines graphics runtime and human cognition. With the IVF file format, the process from the interaction to the visualization is represented with objects, operations, and reactions. The objects record building blocks for the visualization, including visual and text elements. The operations record the ways to select the visual elements. The reactions record how to transform the visual elements in response to the operations.

FIG. 4 is a block diagram illustrating the data structure of IVF file 300 in some examples of the present disclosure. IVF file 300 includes an object array 402, an interaction array 404, a color table 406, a reaction table 408, and an operation table 410. Object array 402 defines each object, which may be a visual element or a text element. Each object includes the following variables: object type (0=vertex and −1=text), display immediately (1=display and 0=do not display), object ID, color ID, size, and x, y, and z coordinates. For the object type, 0 specifies a vertex and −1 specifies text). For the display immediately, 1 specifies display immediately and 0 specifies do not display. Each interaction includes the following variables: object ID, operation ID, and one or more reaction IDs each followed by corresponding operation variable(s). Color table 406 includes color IDs each followed by a corresponding color value (e.g., a hex color code). Reaction table 408 includes reaction IDs each followed by a corresponding reaction type. For the reaction type, 1 specifies information (text) display, 2 specifies enlarge a vertex, and 3 specifies add lines about a vertex. Operation table 410 includes operation ID each followed by a corresponding operation type. For the operation ID, 1 specifies a picking operation. For example, the interaction [1, [1, [[1, 51], [2, 2], [3, 1001, 1002, 1003 . . . 1071]]]] specifies that when a node 1 is picked, the text "amplab/iolap\nlanguage: Scala\nforks: 5" is presented, the node is enlarged, and white lines are presented around the node.

Figure 5:
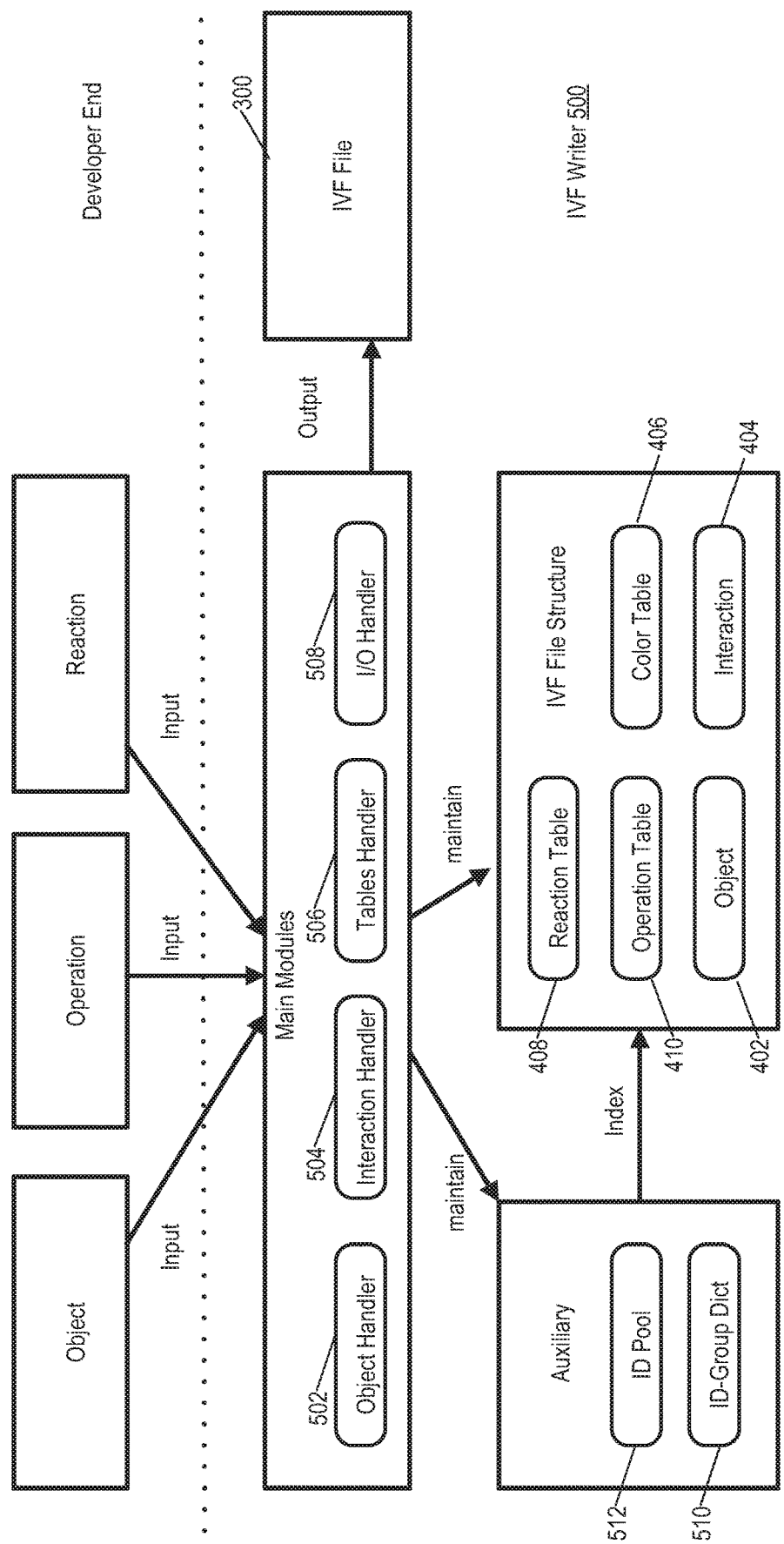
FIG. 5 is a block diagram illustrating an IVF writer in some examples of the present disclosure.

FIG. 5 is a block diagram illustrating an IVF writer 500 (e.g., IVF writer 112 in FIG. 1) in some examples of the present disclosure. Since IVF writer 500 is the interface for developers to generate IVF file 300 following the IVF format, the writer maintains this structure in volatile memory. Specifically, IVF writer 500 includes an object handler 502 to maintain object array 402, an interaction handler 504 to maintain an interaction array 404, and tables handler 506 to maintain color table 406, reaction table 408, and operation table 410. In addition, IVF writer 500 includes an input/output (I/O) handler 508 to export IVF file 300.

To easily apply or update interactions of a group of objects, object handler 502 may maintain group-to-object mappings in a dictionary 510 in volatile memory. For objects that are to be grouped, object handler 502 may assign each object an object ID from an ID pool 512 in volatile memory, map their object IDs to the same group ID, and maintain this group-to-object mapping in dictionary 510.

Interaction handler 504 may receive user selection of a group of objects with a group ID. Based on the group ID, interaction handler 504 may look up dictionary 510 to map the group ID to the objects in the group and create the same interactions for these objects.

Figure 6:
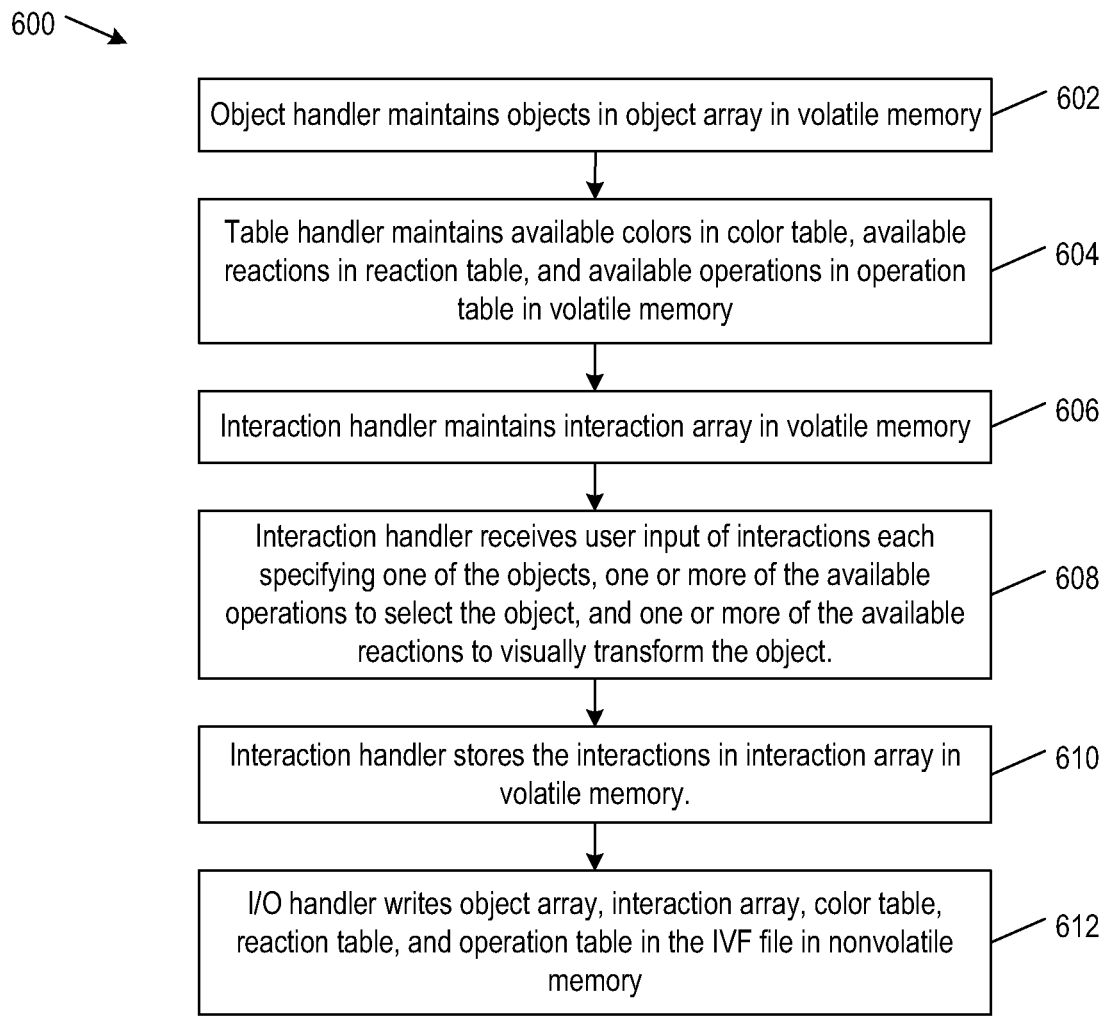
FIG. 6 is a block diagram illustrating a flowchart of a method to implement the IVF write of FIG. 5 in some examples of the present disclosure.

FIG. 6 is a block diagram illustrating a flowchart of a method 600 to implement IVF write 500 (FIG. 5) in some examples of the present disclosure. Method 600, and any method described herein, may be implemented as instructions encoded on a computer-readable medium that is to be executed by a processor in a computer system. Method 600, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 600 may begin in block 602.

In block 602, object handler 502 (FIG. 5) maintains objects in object array 402 (FIG. 5) in volatile memory. Each object in object array 402 includes an object type, an object ID, a color ID, an object size, and an object location. The object type is selected from vertex and text. Object handler 502 may import or otherwise receive at least some of the objects from a graph visualization tool that arranged these objects according to a layout method.

Object handler 502 may maintain group-to-object mappings in dictionary 510 (FIG. 5) in volatile memory. For objects that are to be grouped, object handler 502 assigns each object an object ID from an ID pool 512 (FIG. 5) in volatile memory, maps their object IDs to the same group ID, and maintains this group-to-object mapping in dictionary 510.

Block 602 may be followed by block 604.

In block 604, tables handler 506 (FIG. 5) maintains available colors in color table 406 (FIG. 5) in volatile memory, available reactions in reaction table 408 (FIG. 5) in volatile memory, and available operations in operation table 410 in volatile memory. Each available color in color table 406 includes a color ID and a corresponding color value. Each available reaction in reaction table 408 includes a reaction ID and a corresponding reaction type. The reaction type is selected from information (text) display, enlarge a node, and add lines about a node. Each available operation in operation table 410 includes an operation ID and a corresponding operation type. The operation type is selected from picking a node, selecting nodes in an area, and search for one or more nodes. Block 604 may be followed by block 606.

In block 606, interaction handler 504 (FIG. 5) maintains interaction array 404 (FIG. 5) in volatile memory. Block 606 may be followed by block 608.

In block 608, interaction handler 504 receives user input of interactions each specifying one of the objects, one of the available operations to select the object, and one or more of the available reactions to visually transform the object.

Interaction handler 504 may receive user selection of a group of objects with a group ID. Based on the group ID, interaction handler 504 may look up dictionary 510 to map the group to the objects in the group and store the same available operation and the same one or more available reactions in the interactions of these object. Block 608 may be followed by block 610.

In block 610, interaction handler 504 stores the interactions in interaction array 404 in volatile memory. Each interaction in interaction array 404 includes one of the object IDs, one of the operation IDs, and one or more of the reaction IDs. Block 610 may be followed by block 612.

In block 612, I/O handler 508 writes object array 402, interaction array 404, color table 406, reaction table 408, and operation table 410 in IVF file 300 in nonvolatile memory.

Figure 7:
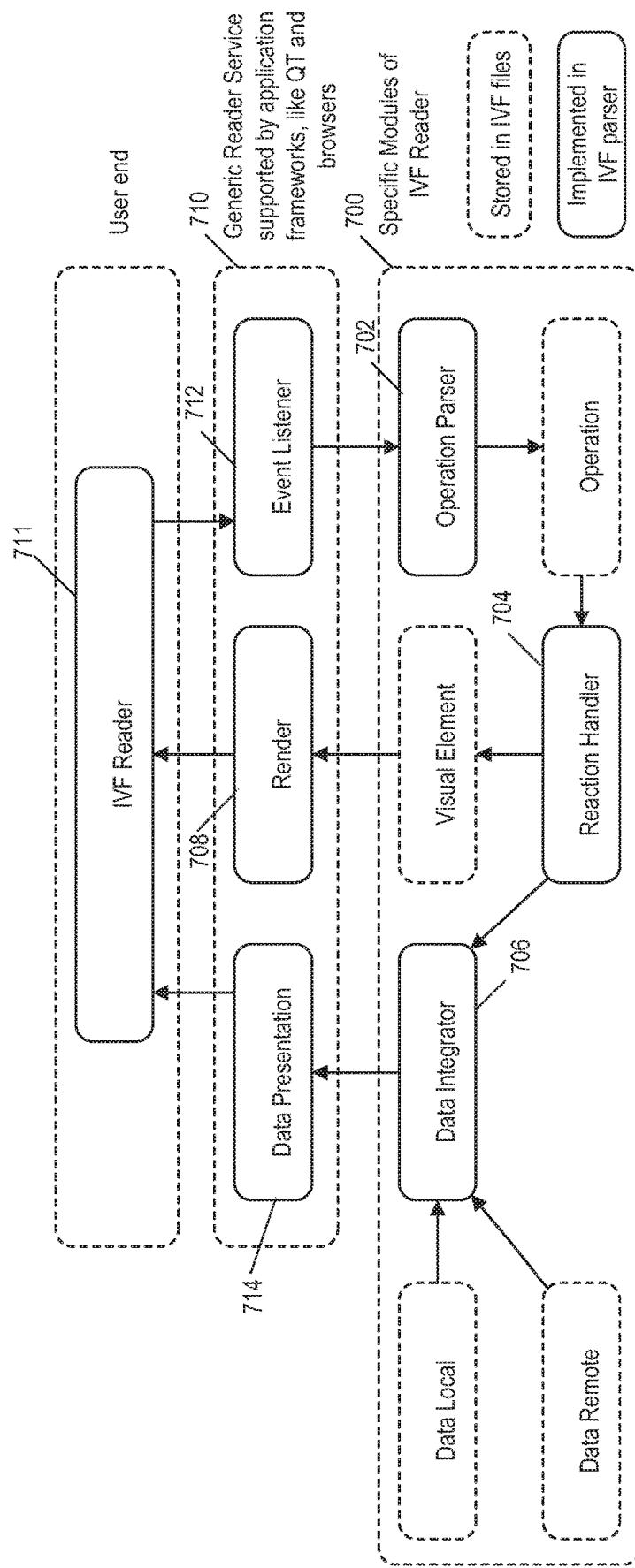
FIG. 7 is a block diagram illustrating an IVF reader in some examples of the present disclosure.

FIG. 7 is a block diagram illustrating an IVF reader 700 (e.g., IVF reader 116 in FIG. 1) in some examples of the present disclosure. IVF reader 700 includes an operation parser 702, a reaction handler 704, and a data integrator 706.

Events are raised from mouse and keyboard by a user. Assuming the events are context-independent, operation parser 702 is implemented as a dictionary checker that directly maps an event to a predefined operation.

Reaction handler 704 maps operations to both visual transformations and data presentations. Visual transformation enables different perspectives toward the visualization by controlling a render runtime 708, such as enlarging a vertex.

Data Integrator 706 accesses the data (text) locally or remotely with RESTful web services. Therefore, data integrator 706 integrates heterogeneous data sources and provide the uniform interface to the application framework with JavaScript Object Notation (JSON).

Figure 8:
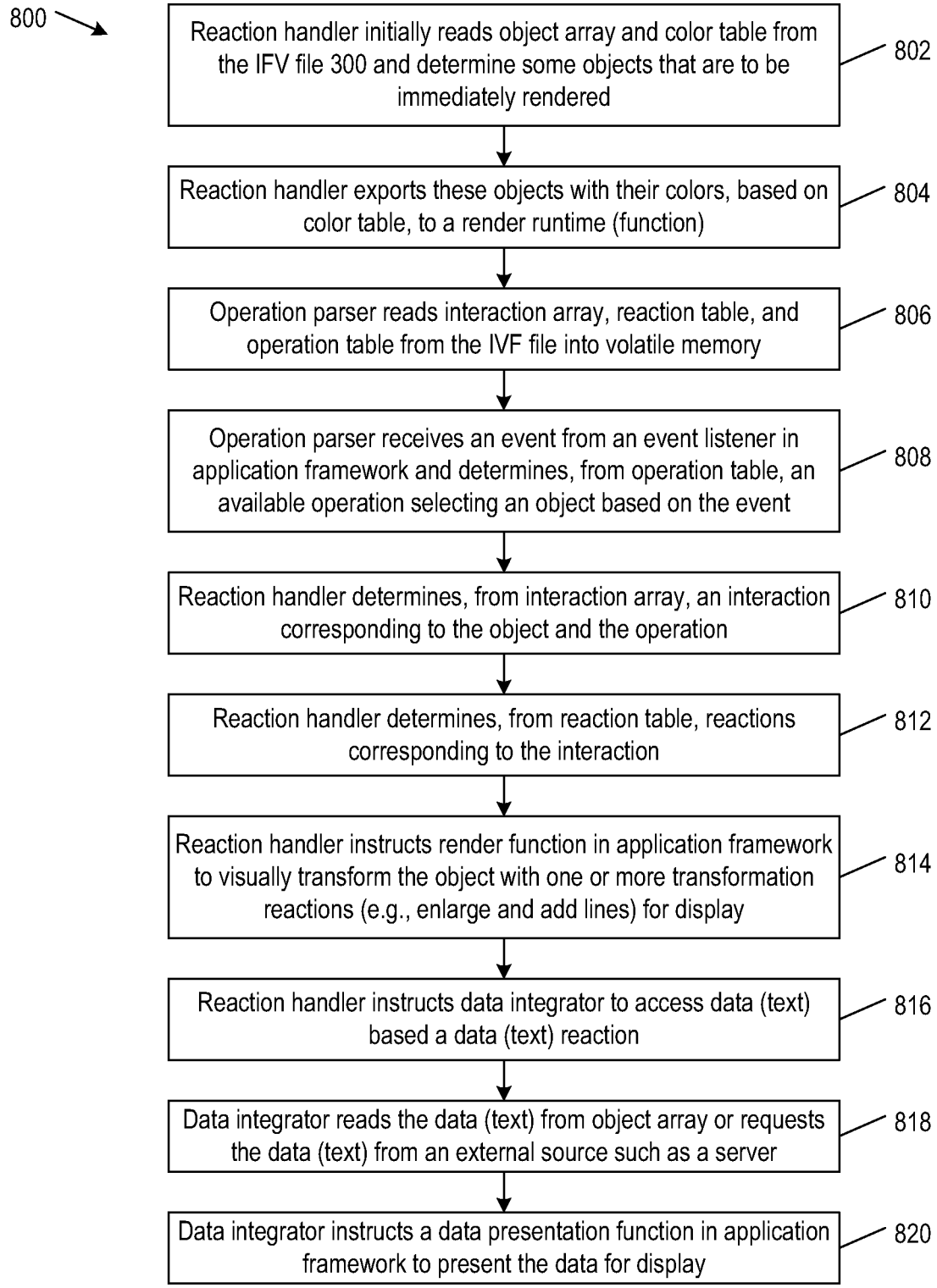
FIG. 8 is a block diagram illustrating a flowchart of a method to implement the IVF reader of FIG. 7 in some examples of the present disclosure.

FIG. 8 is a block diagram illustrating a flowchart of a method 800 to implement IVF reader 700 (FIG. 7) in some examples of the present disclosure. Method 800 may begin in block 802.

In block 802, reaction handler 704 (FIG. 7) initially reads object array 402 (FIG. 5) and color table 406 (FIG. 5) from IFV file 300 (FIG. 5) and determine some objects that are to be immediately rendered. Block 802 may be followed by block 804.

In block 804, reaction handler 704 exports these objects with their colors, based on color table 406, to a render runtime (function) 708 (FIG. 7) in an application framework 710. Render function 708 renders these objects for display 711. Render function 708 performs rendering by calling low-level 3D graphics API, such as WebGL or OpenGL. Block 804 may be followed by block 806.

In block 806, operation parser 702 (FIG. 7) reads interaction array 404 (FIG. 5), reaction table 407 (FIG. 5), and operation table 410 (FIG. 5) from IVF file 300 into volatile memory. Block 806 may be followed by block 808.

In block 808, operation parser 702 receives an event from an event listener 712 (FIG. 7) in application framework 710 and determines, from operation table 410, an available operation selecting an object based on the event. Block 808 may be followed by block 810.

In block 810, reaction handler 704 determines, from interaction array 404, an interaction corresponding to the object and the operation. Block 810 may be followed by block 812.

In block 812, reaction handler 704 determines, from reaction table 408, reactions corresponding to the interaction (e.g., information display, enlarge, and add lines). Block 812 may be followed by block 814.

In block 814, reaction handler 704 instructs render function 708 in application framework 710 to visually transform the object with one or more transformation reactions (e.g., enlarge and add lines) for display 711. Block 814 may be followed by block 816.

In block 816, reaction handler 704 instructs data integrator 706 to access data (text) based on a data (text) reaction. Block 816 may be followed by block 818.

In block 818, data integrator 706 (FIG. 7) reads the data (text) from object array 402 or requests the data (text) from an external source such as a server. Communication with the external source may use RESTful web services with the JSON format for the data. Block 818 may be followed by block 820.

In block 820, data integrator 706 instructs a data presentation function 714 (FIG. 7) in application framework 710 to present the data for display 711.

Figure 9:
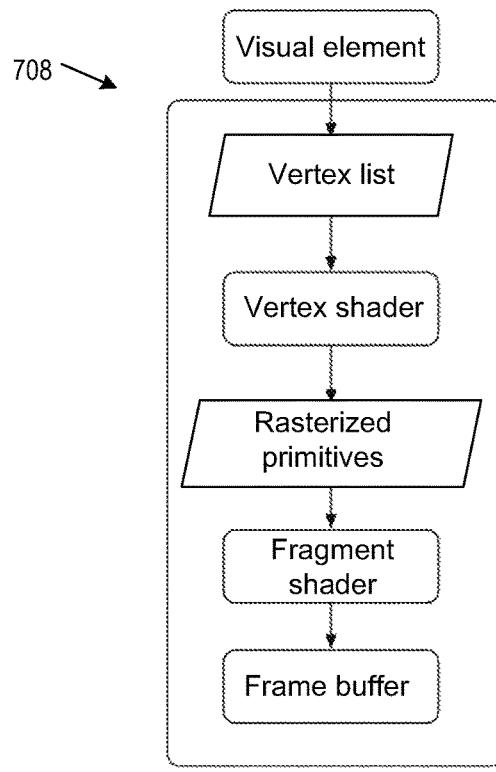
FIG. 9 is a block diagram illustrating a render function in an application framework of FIG. 7, such as a browser, in some examples of the present disclosure.

FIG. 9 is a block diagram illustrating render function 708 in application framework 710 (FIG. 7), such as a browser, in some examples of the present disclosure. Render function 708 receives a visual element from reaction handler 704 (FIG. 7). A vertex shader takes the vertices of the visual element and calculates their positions and other details, which are then assembled into primitives (such as points, lines, and triangles) and rasterized. A fragment shader takes the primitives and computes a color for each pixel of the primitive. The resulting pixels are stored in an output frame buffer for display.

Figure 10:
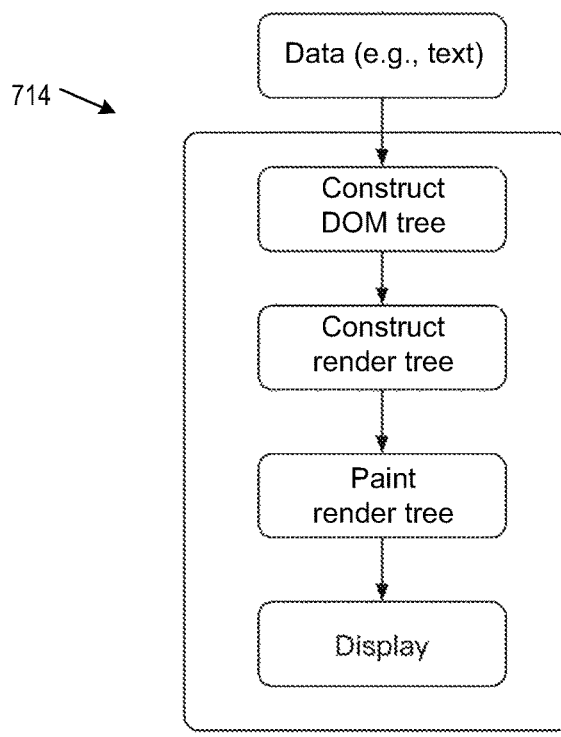
FIG. 10 is a block diagram illustrating a data presentation function in the application framework of FIG. 7, such as a browser, in some examples of the present disclosure.

FIG. 10 is a block diagram illustrating data presentation function 714 in application framework 710 (FIG. 7), such as a browser, in some examples of the present disclosure. Data presentation function 714 receives the data (e.g., text) from data integrator 706 (FIG. 7), constructs a Document Object Model (DOM) tree, constructs a render tree based on the DOM tree, paints the render tree, and outputs the result for display.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for interactively visualizing a graph comprising objects, comprising:

maintaining the objects in an object array in volatile memory;

maintaining available operations in an operation table in volatile memory;
maintaining available reactions in a reaction table in volatile memory;
maintaining an interaction array in volatile memory;
receiving user input of interactions each specifying one of the objects, one or more of the available operations to select said one of the objects, and one or more of the available reactions to visually transform the said one of the objects;
storing the interactions in the interaction array in volatile memory; and
writing the operation table, the reaction table, the object array, and the interaction array in a computer-readable file in nonvolatile memory.

2. The method of claim 1, wherein:
each object in the object array comprises an object type, an object ID, an object size, and an object location;
each available operation in the operation table comprises an operation ID and an operation type;
each available reaction in the reaction table comprises a reaction ID and a reaction type; and
each interaction in the interaction array comprises one of the object IDs, one or more of the operation IDs, and one or more of the reaction IDs.

3. The method of claim 2, wherein the operation type is selected from the group comprising pick, select area, and search.

4. The method of claim 3, wherein the reaction type is selected from the group comprising text display, enlarge, and add lines.

5. The method of claim 4, wherein the object type is selected from the group comprising vertex and text.

6. The method of claim 2, further comprising maintaining available colors in a color table in volatile memory and writing the color table in the computer-readable file in nonvolatile memory, wherein:
each available color in the color table comprises a color ID and a color value;
each object in the object array comprises one of the color IDs.

7. The method of claim 1, further comprising importing at least some of the objects from a graph visualization tool that arranged the at least some of the objects according to a layout method.

8. The method of claim 1, further comprising maintaining group-to-object mappings in a dictionary in volatile memory, wherein:
said receiving user input of interactions includes receiving user selection of a group; and
said storing the interactions includes looking up the dictionary to map the group to a plurality of objects and storing the same one or more available operations and the same one or more available reactions in the interactions of the plurality of object.

9. The method of claim 1, further comprising:
reading the object array from the computer-readable file and determining a plurality of objects that are to be immediately rendered;
exporting the plurality of objects to a render function in an application framework, the render function rendering the plurality of objects;
reading the operation table from the computer-readable file;
receiving an event from an event listener in the application framework;
determining, from the operation table, an available operation selecting an object based on the event;
reading the interaction array from the computer-readable file;
determining, from the interaction array, an interaction corresponding to the object and the operation;
reading the reaction table from the computer-readable file;
determining, from the reaction table, at least one reaction corresponding to the interaction; and
instructing the render function in the application framework to visually transform the object with the at least one reaction.

10. The method of claim 9, wherein the render function performs rendering by calling low-level 3D graphics application programming interface.

11. The method of claim 9, further comprising:
determining, from the reaction table, another reaction corresponding to the interaction; and
accessing data based on the other reaction, the data being stored locally as one of the objects in the computer-readable file or remotely outside of the computer-readable file.

12. The method of claim 11, further comprising instructing a data presentation function in the application framework to present the data.

13. A writer of a computer-readable file representing a graph comprising objects, the writer comprising:
an object handler configured to maintain the objects in an object array in volatile memory;
a tables handler configured to:
maintain available operations in an operation table in volatile memory; and
maintain available reactions in a reaction table in volatile memory;
an interaction handler configured to:
maintain an interaction array in volatile memory;
receive user input of interactions each specifying one of the objects, one or more of the available operations to select said one of the objects, and one or more of the available reactions to visually transform the said one of the objects; and
store the interactions in the interaction array in volatile memory; and
an input/output handler configured to write the operation table, the reaction table, the object array, and the interaction array in the computer-readable file in nonvolatile memory.

14. The writer of claim 13, wherein:
each object in the object array comprises an object type, an object ID, an object size, and an object location;
each available operation in the operation table comprises an operation ID and an operation type;
each available reaction in the reaction table comprises a reaction ID and a reaction type; and
each interaction in the interaction array comprises one of the object IDs, one or more of the operation IDs, and one or more of the reaction IDs.

15. The writer of claim 14, wherein the operation type is selected from the group comprising pick, select area, and search.

16. The writer of claim 15, wherein the reaction type is selected from the group comprising text display, enlarge, and add lines.

17. The writer of claim 16, wherein the object type is selected from the group comprising vertex and text.

18. The writer of claim 14, wherein:
the tables handler is further configured to maintain available colors in a color table in volatile memory;
each available color in the color table comprises a color ID and a color value;
each object in the object array comprises one of the color IDs; and
the input/output handler is further configured to write the color table in the computer-readable file in nonvolatile memory.

19. The writer of claim 13, wherein the input/output handler is further configured to importing at least some of the objects from a graph visualization tool that arranged the at least some of the objects according to a layout method.

20. The writer of claim 13, wherein:
the object handler is further configured to maintain group-to-object mappings in a dictionary in volatile memory; and
the interaction handler is further configured to receive user selection of a group; and looking up the dictionary to map the group to a plurality of objects and storing the same one or more available operations and the same one or more available reactions in the interactions of the plurality of object.

21. A reader of a computer-readable file representing a graph comprising objects, the reader comprising:
a reaction handler configured to:
read an object array from the computer-readable file and determine a plurality of objects that are to be immediately rendered;
export the plurality of objects to a render function in an application framework, the render function rendering the plurality of objects;
an operation parser configured to:
read an operation table from the computer-readable file;
receive an event from an event listener in the application framework; and
determine, from the operation table, an available operation selecting an object based on the event; and
the reaction handler further configured to:
reading an interaction array from the computer-readable file;
determine, from the interaction array, an interaction corresponding to the object and the operation;
reading a reaction table from the computer-readable file;
determine, from the reaction table, at least one reaction corresponding to the interaction; and
instructing the render function in the application framework to visually transform the object with the at least one reaction.

22. The reader of claim 21, wherein the render function performs rendering by calling low-level 3D graphics application programming interface.

23. The reader of claim 21, further comprising a data integrator, wherein the reaction handler is further configured to:
determine, from the reaction table, another reaction corresponding to the interaction; and
instruct a data integrator to access data based on the other reaction, the data being stored locally as one of the objects in the computer-readable file or remotely outside of the computer-readable file.

24. The reader of claim 23, wherein the data integrator is configured to instruct a data presentation function in the application framework to present the data.

* * * * *